United States Patent
Whitney et al.

(10) Patent No.: US 12,555,830 B2
(45) Date of Patent: Feb. 17, 2026

(54) BATTERY MODULE WITH SMART ELECTRONIC ISOLATION SYSTEMS

(71) Applicant: SparkCharge, Inc., Somerville, MA (US)

(72) Inventors: Richard Whitney, Somerville, MA (US); Christopher R. Ellis, Melrose, MA (US)

(73) Assignee: SparkCharge, Inc., Somerville, MA (US)

( * ) Notice: Subject to any disclaimer, the term of this patent is extended or adjusted under 35 U.S.C. 154(b) by 476 days.

(21) Appl. No.: 18/310,326

(22) Filed: May 1, 2023

(65) Prior Publication Data
US 2023/0268564 A1    Aug. 24, 2023

Related U.S. Application Data

(63) Continuation of application No. 17/006,409, filed on Aug. 28, 2020, now Pat. No. 11,664,538.
(Continued)

(51) Int. Cl.
*H01M 10/42* (2006.01)
*H01M 10/48* (2006.01)
*H01M 50/581* (2021.01)

(52) U.S. Cl.
CPC ..... *H01M 10/425* (2013.01); *H01M 10/4207* (2013.01); *H01M 10/482* (2013.01);
(Continued)

(58) Field of Classification Search
CPC ............... H01M 10/42; H01M 10/425; H01M 10/4207; H01M 10/48; H01M 10/486; H01M 10/482; H01M 50/581
See application file for complete search history.

(56) References Cited

U.S. PATENT DOCUMENTS 9,065,280 B2    6/2015  Workman et al.
9,196,930 B2   11/2015  Chorian et al.
(Continued)

FOREIGN PATENT DOCUMENTS

EP    2670012 A1    12/2013
EP    3223341        9/2017
JP    2015070690 A   4/2015

OTHER PUBLICATIONS

European extended Search Report dated Oct. 11, 2023, 11 pp.
(Continued)

*Primary Examiner* — Karie O'neill Apicella
(74) *Attorney, Agent, or Firm* — Heslin Rothenberg Farley and Mesiti P.C.; Victor A. Cardona, Esq.

(57) ABSTRACT

A battery module includes a first set of power contacts and a first set of signal contacts. A battery pack is operable to deliver electrical power to the set of power contacts. An electronic isolation system is operable to electrically disconnect and electrically connect the battery pack and the first set of power contacts. An electronic control system is operable to obtain a comparisons between a state of charge, state of health, temperature and power of the battery module and an electrical device. A closing parameter is calculated that is based on at least one of the comparisons. The closing parameter is compared to a predefined closing parameter value to result in a connect determination. The electronic isolation system connects or disconnects the battery pack to the first set of power contacts based on a positive or a negative result respectively of the connect determination.

17 Claims, 8 Drawing Sheets

FIG. 2

Related U.S. Application Data

(60) Provisional application No. 62/892,809, filed on Aug. 28, 2019.

(52) U.S. Cl.
CPC ....... *H01M 10/486* (2013.01); *H01M 50/581* (2021.01); *H01M 2010/4271* (2013.01)

(56) References Cited

U.S. PATENT DOCUMENTS

| | | | |
|---|---|---|---|
| 9,231,407 | B2 | 1/2016 | Shim |
| 9,263,776 | B2 | 2/2016 | Yun et al. |
| 9,525,290 | B2 | 12/2016 | Snyder |
| 9,627,720 | B2 | 4/2017 | Yun |
| 9,774,193 | B2 | 9/2017 | Gaylo et al. |
| 10,084,323 | B2 | 9/2018 | Fetzer et al. |
| 10,576,844 | B2 | 3/2020 | Kim |
| 10,608,294 | B2 | 3/2020 | Sasaki et al. |
| 2001/0028571 | A1 | 10/2001 | Hanada et al. |
| 2010/0045236 | A1 | 2/2010 | Muraoka et al. |
| 2010/0121511 | A1 | 5/2010 | Onnerud et al. |
| 2010/0259856 | A1 | 10/2010 | Senriuchi et al. |
| 2011/0060538 | A1 | 3/2011 | Fahimi et al. |
| 2012/0105065 | A1 | 5/2012 | Namou et al. |
| 2012/0242144 | A1 | 9/2012 | Chorian et al. |
| 2012/0310565 | A1 | 12/2012 | Redey |
| 2013/0154569 | A1 | 6/2013 | Endo et al. |
| 2013/0221919 | A1 | 8/2013 | Gallegos et al. |
| 2014/0015488 | A1 | 1/2014 | Despesse |
| 2016/0156206 | A1* | 6/2016 | Yamaji ............... H02H 3/044 320/112 |
| 2017/0047617 | A1 | 2/2017 | Liao et al. |
| 2017/0108552 | A1 | 4/2017 | Roumi et al. |
| 2017/0222276 | A1 | 8/2017 | Liu et al. |
| 2017/0294691 | A1 | 10/2017 | Yamamoto et al. |
| 2019/0103639 | A1 | 4/2019 | Guglielmo et al. |
| 2020/0076206 | A1 | 3/2020 | Goto et al. |
| 2020/0169082 | A1 | 5/2020 | Yasoshima et al. |
| 2020/0225275 | A1 | 7/2020 | Du et al. |
| 2020/0274386 | A1* | 8/2020 | Kirleis ................ H02J 7/0025 |
| 2021/0066761 | A1 | 3/2021 | Whitney et al. |

OTHER PUBLICATIONS

International Search Report and Written Opinion dated Nov. 13, 2020, 21 pgs.

Daowd et al., Battery Management System—Balancing Modularization Based on a Single Switched Capacitor and Bi-Directional DC/DC Converter with the Auxiliary Battery, Energies, 2014, pp. 1-41, vol. 7, MDPI, Switzerland.

Alavi et al., Fault Detection and Isolation in Batteries Power Electronics and Chargers, Journal of Energy Storage, Oct. 2019, vol. 25, Abstract only, 2 pgs.

Hong et al., Research on Integration Simulation and Balance Control of a Novel Load Isolated Pure Electric Driving System, Journal of Energy Storage, Dec. 2019, vol. 189, Elsevier, Abstract only.

Hoque et al., Battery Charge Equalization Controller in Electric Vehicle Applications: A Review, Aug. 2017, pp. 1363-1385, vol. 75, Elsevier, Abstract only, 2 pgs.

Jiang et al., Autonomous Demand-Side Current Scheduling of Parallel Buck Regulated Battery Modules, Abstract only, 3 pgs.

Notice of Allowance in U.S. Appl. No. 17/006,409, dated Jan. 27, 2023, 17 pgs.

Office Action in U.S. Appl. No. 17/006,409, dated Jul. 27, 2022, 19 pgs.

Restriction Requirement in U.S. Appl. No. 17/006,409, dated May 9, 2022, 10 pgs.

* cited by examiner

BATTERY MODULE WITH SMART ELECTRONIC ISOLATION SYSTEMS

CROSS REFERENCE TO RELATED APPLICATIONS

This patent application is a continuation of, and claims priority to, U.S. patent application Ser. No. 17/006,409, filed on Aug. 28, 2020 and entitled: "BATTERY MODULE WITH SMART ELECTRONIC ISOLATION SYSTEMS;" which claims priority to U.S. provisional patent application No. 62/892,809, filed on Aug. 28, 2019, and entitled BATTERY INTERLOCK SMART CLOSE-IN SYSTEM." The entire contents of the aforementioned applications are hereby incorporated herein by reference.

TECHNICAL FIELD

The present disclosure relates to battery modules. More specifically, the disclosure relates to battery modules having smart electronic isolation systems.

BACKGROUND

A battery module system is a set of any number of battery modules, wherein each battery module includes a battery pack. Each battery pack includes one or more battery cells. The battery modules of the battery module system may be electrically configured in series, parallel or a mixture of both to deliver the desired voltage, capacity, or power density required for any number of applications. Battery module systems are used in energy dense battery applications such as charging an electric vehicle ("EV"), powering heavy duty power tools, or the like.

The risk of assembling the battery modules of a battery module system may be low as long as the battery packs are equally matched. Battery packs may be precisely measured, calibrated and matched at the initial manufacturer for such parameters as internal resistance, initial voltage and state of charge (SOC). The battery modules may then be discharged at the factory down to a SOC that is legal for shipping (for example, between 30% to 60% of full charge) and shipped to their final destination, where the battery modules can be assembled into the desired battery module systems.

Problematically however, battery modules may have their SOC, internal resistance and other internal parameters inadvertently changed during shipment. For example, conductive materials may come into contact with the power contacts of the battery modules during shipment. Additionally, the battery modules may have their internal parameters altered at different rates or to different degrees during use. If the difference in internal parameters between two battery modules are unacceptably high, the risk of arcing, fire or other hazards grow significantly.

Further, if two battery modules are at a significantly different SOC, the battery module with the greater SOC will discharge into the battery module with the lesser SOC, and the total power output will drop significantly. Moreover, significantly different SOCs between battery modules may cause back flow currents, which can damage a battery module.

Accordingly, there is a need for a battery module that can prevent or inhibit making electrical contact with other battery modules (or other similar electrical devices) if their internal parameters are significantly different. Further, there is a need for a battery module that can prevent or inhibit back flow. Additionally, there is a need for a battery module system wherein the individual battery modules of the battery module system may selectively connect with each other depending on the differences in internal parameters of each battery module.

BRIEF DESCRIPTION

The present disclosure offers advantages and alternatives over the prior art by providing a battery module with an electronic isolation system electrically connected between the battery pack and the power contacts of the battery module and an electronic control system controlling the electronic isolation system. The electronic isolation system, controlled by the electronic control system, prevents the battery pack from connecting to the power contacts if one or more parameters from either the battery module or a second electrical device that is to be connected to the battery module are at an unacceptable value. For example, the electronic control system may prevent electrical contact between the battery pack and power connectors of a first battery module that is to be connected to a second battery module, if the SOCs of the first and second battery modules are outside of an acceptable range of value. Further, the battery modules may be assembled into a battery module system wherein each of the battery modules may selectively connect to the other battery modules depending on differences in their internal parameters. Additionally, the control system prevents or inhibits current back flow from the power connectors to the battery pack of a battery module.

A battery module in accordance with one or more aspects of the present disclosure includes a first set of power contacts and a first set of signal contacts. A battery pack is operable to deliver electrical power to the set of power contacts. An electronic isolation system is operable to electrically disconnect and electrically connect the battery pack and the first set of power contacts. An electronic control system is electrically connected to the electronic isolation system and to one of the first set of signal contacts and/or the first set of power contacts. The electronic control system is operable to obtain a first comparison between a state of charge of the battery module and an electrical device, obtain a second comparison between a state of health of the battery module and the electrical device, obtain a third comparison between a temperature of the battery module and the electrical device and obtain a fourth comparison between a power of the battery module and the electrical device. A closing parameter is calculated by the electronic control system that is based on the first comparison, the second comparison, the third comparison and/or the fourth comparison. The closing parameter is compared to a predefined closing parameter value to result in a connect determination as to whether it is desirable to connect the first battery module to the electrical device. The electronic isolation system connects the battery pack to the first set of power contacts based on a positive result of the connect determination. The electronic isolation system disconnects the battery pack and the first set of power contacts based on a negative result of the connect determination.

A battery module system in accordance with one or more aspects of the present disclosure includes a battery module system power bus and a plurality of battery modules. A first battery module of the plurality of battery modules includes a first set of power contacts electrically connected to the power bus, a first set of signal contacts and a first battery pack operable to deliver electrical power to the first set of power contacts. A first electronic isolation system is operable to electrically disconnect and connect the first battery pack and the first set of power contacts. A first electronic control system is electrically connected to the electronic isolation system and to the first set of signal contacts and/or the first set of power contacts. The electronic control system is operable to obtain a first comparison between a state of charge of the first battery module and a second battery module of the plurality of battery modules, obtain a second comparison between a state of health of the first battery module and the second battery module, obtain a third comparison between a temperature of the first battery module and the second battery module and obtain a fourth comparison between a power of the first battery module and the second battery module. A closing parameter is calculated based on the first comparison, the second comparison, the third comparison and/or the fourth comparison. The closing parameter is compared to a predefined closing parameter value to result in a connect determination as to whether it is desirable to connect the first battery module to the second battery module. The electronic isolation system connects the battery pack to the first set of power contacts based on a positive result of the connect determination. The electronic isolation system disconnects the battery pack and the first set of power contacts based on a negative result of the connect determination.

A computer implemented method of connecting a battery module to an electrical device, in accordance with one or more aspects of the present disclosure, includes measuring a temperature of a battery module and an electrical device with the at least one temperature sensor, measuring a current of the battery module and the electrical device with the at least one current sensor and measuring a voltage of the battery module and the electrical device with the at least voltage sensor. A state of charge, a state of health and a power of the battery module is calculated from at least one of the current, temperature or voltage of the battery module. A state of charge, a state of health and a power of the electrical device is calculated from at least one of the current, temperature or voltage of the electrical device. A first comparison is obtained between a state of charge of the battery module and the electrical device. A second comparison is obtained between a state of health of the battery module and the electrical device. A third comparison is obtained between a temperature of the battery module and the electrical device. A fourth comparison is obtained between a power of the battery module and the electrical device. A closing parameter is calculated based on the first, second, third and fourth comparisons. The closing parameter is compared to a predefined closing parameter value to result in a connect determination.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to +10%, such as less than or equal to +5%, such as less than or equal to +2%, such as less than or equal to +1%, such as less than or equal to +0.5%, such as less than or equal to +0.2%, such as less than or equal to +0.1%, such as less than or equal to +0.05%.

Figure 1:
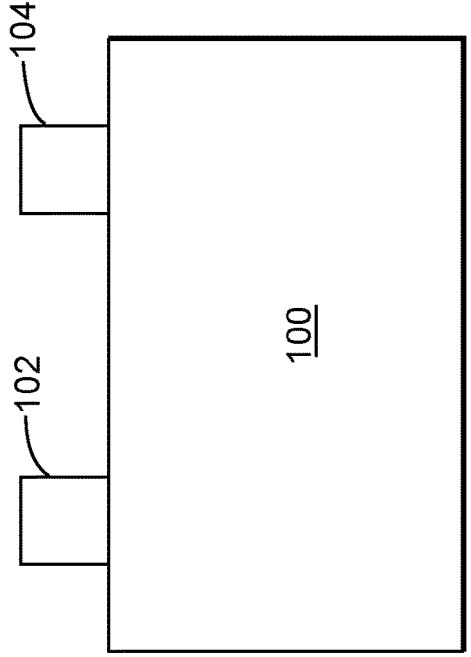
FIG. 1 depicts an example of a schematic of a battery module and its outside interfaces, according to aspects described herein.

Referring to FIG. 1, an example is depicted of a schematic of a first battery module 100 and its outside interfaces, according to aspects described herein. The outside interfaces include one or more sets of power contacts 102 and one or more sets of signal contacts 104. Each set of power contacts 102 may have one or more contacts that are operable to conduct power generated from a battery pack 106 (see FIG. 2) to the battery module 100. Each set of signal contacts 104 may have one or more contacts that are operable to communicate with, send and/or receive signals.

As an overview, battery modules, such as battery module 100, may be electrically isolated from the outside world during transportation and storage to prevent the risk of electric shock and other safety hazards, such as arcing. As will be described in greater detail herein, the battery module 100 uses hardware and software redundancies before allowing for the energization of the power contacts 102.

This ensures that the power contacts 102 only become energized after being connected to a second electrical device 120 (see FIG. 3) when certain measured parameters of either the battery module 100 or the second electrical device 120 have an acceptable value. The second electrical device may be, for example, an energy transfer module, a specific battery module charger, a specific predetermined load, and/or additional battery modules. The battery module 100 may be used in energy dense battery module systems 200 (see FIG. 5) used, by way of example, for charging a battery 206 of an electric vehicle 207 (see FIG. 5). In addition, the battery module 100 contains electrical hardware that ensures multiple battery modules connected do not discharge into each other. The power flow control system 108 of battery module 100 ensures substantially insignificant reverse currents no matter what voltage the battery module 100 and a second electrical device 120 are at. This improves the efficiency and reliability of the battery module 100.

Figure 2:
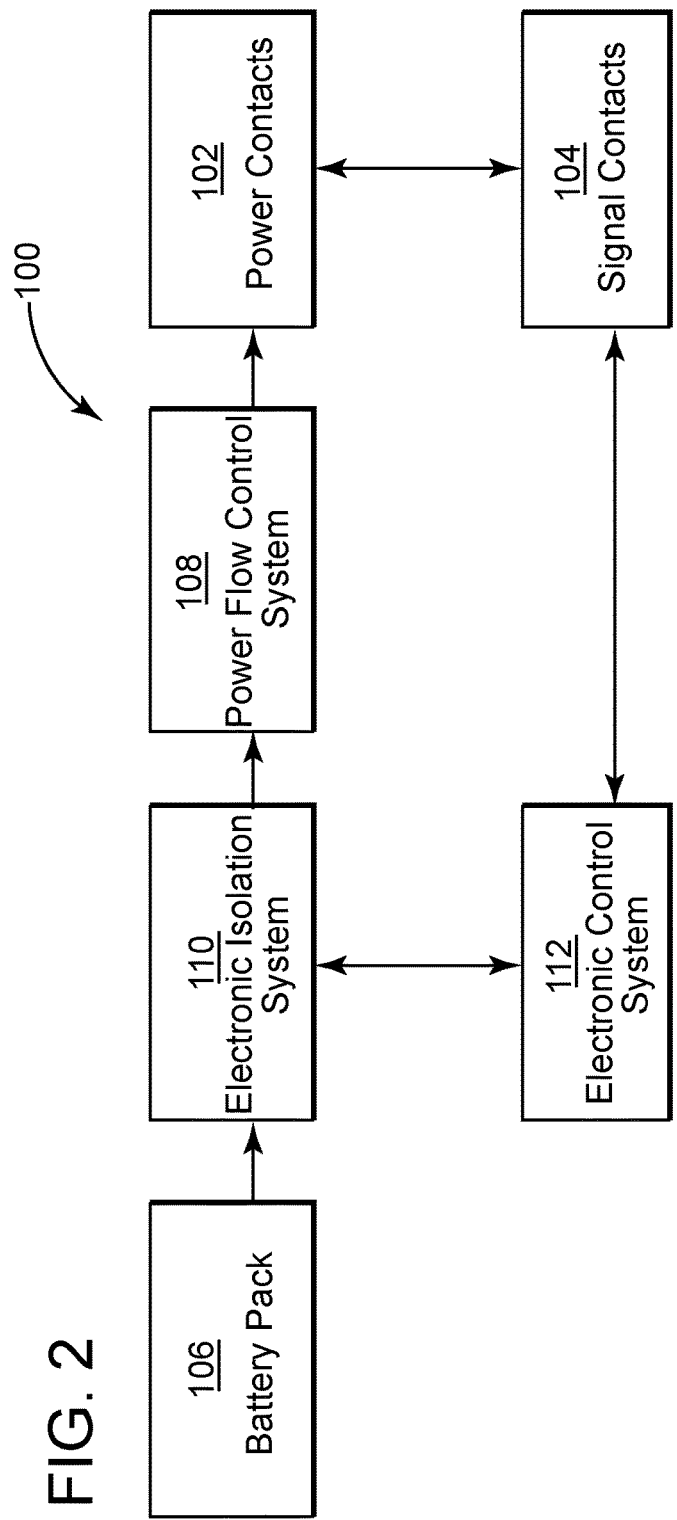
FIG. 2 depicts an example of a schematic of an embodiment of power and communication systems of the battery module of FIG. 1, according to aspects described herein.

Referring to FIG. 2, an example is depicted of a schematic of an embodiment of power and communication systems of the battery module 100, according to aspects described herein. As mentioned earlier, the battery module 100 includes, one or more sets of power contacts 102 and signal contacts 104 as outside interfaces. Additionally, inside the battery module 100 is battery pack 106, power flow control system 108, an electronic isolation system 110, and an electronic control system 112 for both the battery module 100 and the other electrical devices, such as the second electrical device 120 depicted in FIG. 3.

The power contacts 102 provide the ability to charge or discharge the battery module 100. The signal contacts 104 transfer auxiliary voltages, control signals, and serial communication lines between battery modules 100 and other electrical devices 120. As depicted in FIG. 2, the power flow control system 108 prevents or inhibits a battery module 100 with a lower state of charge (SOC) from being charged by a battery module 100 with a higher SOC. The electronic isolation system 110 is a system that may include active switching elements (see FIG. 4) that ensure that the power connectors 102 are not energized in the absence of a control voltage (not shown) on the electronic isolation system 110. The electronic control system 112 in the battery module 100 handles a multitude of functions. By way of example, the electronic control system 112 may provide auxiliary voltages to devices external to the battery module 100, determine the number of connected battery modules 100 in a battery module system 200 (see FIG. 5), provide serial communication between the battery module 100 and external devices (such as electrical device 120 of FIG. 3), and determine when to safely turn on and off the electronic isolation system 110.

The electronic control system 112 contains several electrical signals and sensors (see FIG. 4) that may be used to control the electronic isolation system 110 and the power flow control system 108. Those signals and sensors include, but are not limited to battery count, top detect, bottom detect, CAN bus, battery enable, and control voltages. The combination of these signals and sensors allow for the battery module 100 and battery module system 200 to ensure that they only energize the power terminals 102 when an appropriate device (such as second electrical device 120 of FIG. 3) is connected and ready to use the energy stored in the battery modules 100 and/or batter module systems 200.

Referring again to FIGS. 1 and 2, the first battery module includes a first set of power contacts 102 and a first set of signal contacts 104 as outside interfaces. A battery pack 106 is operable to deliver electrical power to the set of power contacts 102. The battery pack 106 may be comprised of a system of battery cells (not shown). Each battery cell may include one or more anodes and cathodes separated by an electrolyte.

An electronic isolation system 110 is operable to electrically disconnect and electrically connect the battery pack 106 and the first set of power contacts 102. An electronic control system 112 is electrically connected to the electronic isolation system 110 and to at least one of the first set of signal contacts 104 or the first set of power contacts 102. The electronic control system 112 is operable to measure a parameter associated with the first battery module 100 and/or a second electrical device 120 (see FIG. 3) and to compare the parameter to a predefined value to determine if it is desirable to connect the first battery module 100 to the second electrical device 120. The electronic isolation system 110 may connect the battery pack 106 to the first set of power contacts 102 based on a positive result of the comparison of the parameter to the predetermined value. The electronic isolation system may disconnect the battery pack 106 and the first set of power contacts 102 based on a negative result of the comparison.

The second electrical device 120 can be several different types of devices. For example, it could be another battery module 100. Also, it could be a charging device, or an energy transfer module or a specific predetermined load.

The measured parameter described above may be one of several parameters and/or characteristics of either the first battery module 100 or the second electrical device 120 that are important for functioning. For example, the measured parameter could indicate the presence or absence of a certain characteristic in the first battery module 100 and/or second electrical device 120. Also, by way of example, the parameter could be a resistance, a current, a voltage, State of Charge (SOC) or a state of health (SOH) of either the first battery module 100 or the second electrical device 120.

The parameter associated with the first battery module 100 and/or the second electrical device 120 may also include a first parameter associated with the first battery module 100, and a second parameter associated with the second electrical device 120. Additionally, the comparison of the parameter to a predefined value may further include a comparison of a difference between the first parameter and the second parameter to a predefined acceptable range of the difference. If the difference is within the acceptable range, the electronic isolation system 110 may connect the battery pack 106 to the first set of power contacts 102. If the difference is not within the acceptable range, the electronic isolation system 110 may disconnect the battery pack 106 and the first set of power contacts 102.

In other words, the parameter may also be a differential of two parameters measured in both the first battery module 100 and the second electrical device 120. For example, the parameter may be a difference between a state of health (SOH) or a state of charge (SOC) between the first battery module 100 and the second electrical device 120.

The predetermined value that the parameter is compared to may be a value that is significant for functioning of the first battery module 100 and/or the second electrical device 120. For example, the predetermined value may be an acceptable range for a difference in the SOC between the first battery module 100 and the second electrical device 120 (e.g., the second electrical device 120 may be a second battery module 100). For example, an acceptable range may be that the SOC of the first battery module 100 be within plus or minus 50 percent, plus or minus 30 percent, plus or minus 25 percent, plus or minus 15 percent, plus or minus 10 percent, or plus or minus 5 percent of the SOC of the second electrical device.

The first battery module 100 also includes a power flow control system 108 that is connected between the battery pack 106 and the first set of power contacts 102. In the example illustrated in FIG. 2, the power flow control system 108 is connected between the electronic isolation system 110 and the first set of power contacts 102. The power flow control system 108 is operable to prevent or inhibit reverse flow of current from the first set of power contacts 102 to the battery pack 106. The power flow control system 108 may include at least one diode 140 (see FIG. 4) connected between the battery pack 106 and the first set of power contacts 102.

Figure 3:
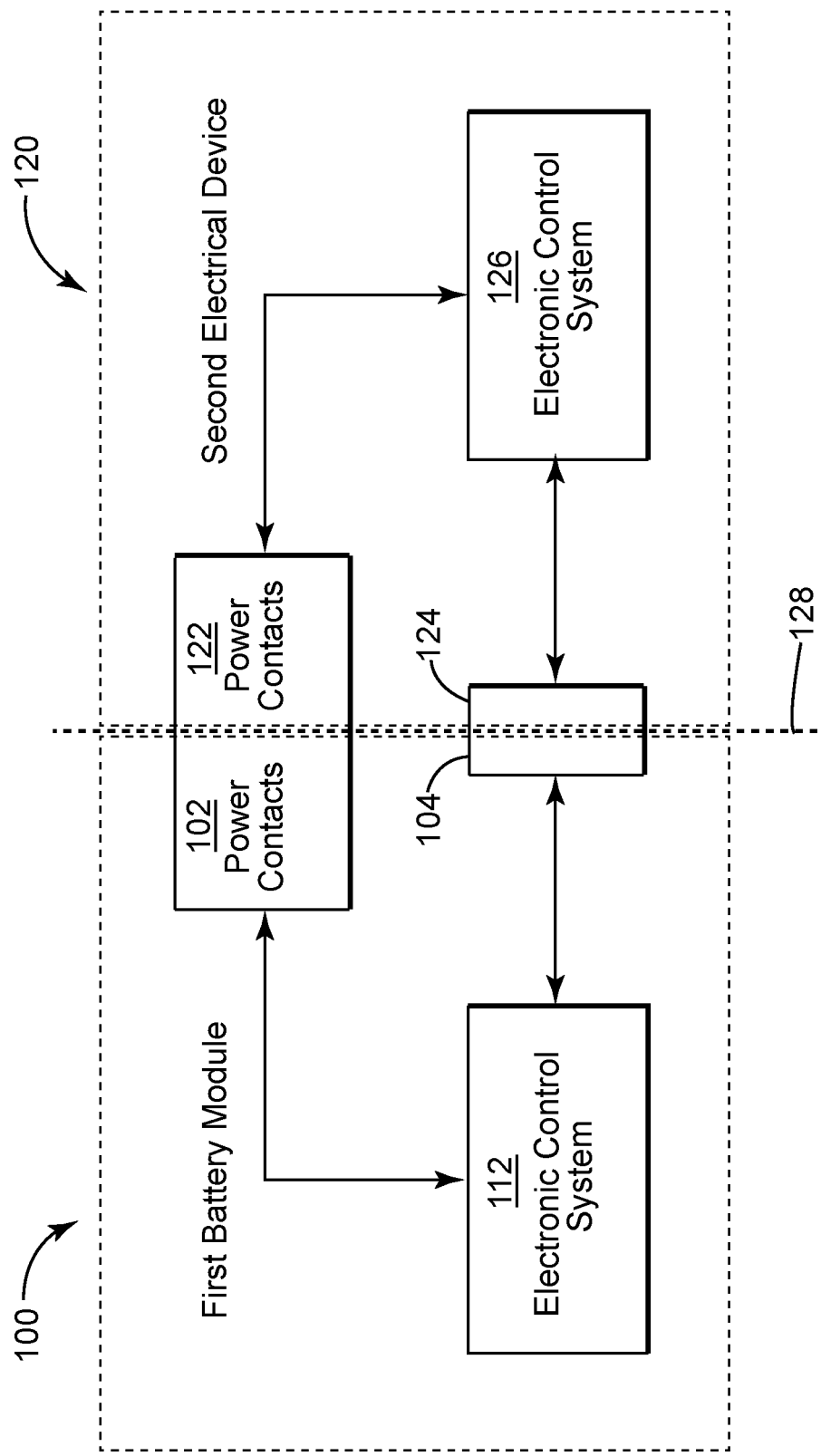
FIG. 3 depicts an example of a schematic of a control interface between a battery module (such as in FIG. 1) and an electrical device, according to aspects described herein.

Referring to FIG. 3, an example is depicted of a schematic of a control interface 128 between the first battery module 100 and a second electrical device 120, according to aspects described herein. The first battery module 100 includes a first set of power contacts 102 that are operable to electrically connect at control interface 128 to a second set of power contacts 122 of the second electrical device 120. Additionally, the first set of signal contacts 104 of the battery module 100 are operable to electrically connect to a second set of signal contacts 124 of the second electrical device 120.

As illustrated in FIG. 3, the electronic control system 112 of the battery module 100 and the electronic control system 126 of the second electrical device 120 are both operable to measure a difference between a first parameter associated with the battery module 100 and a second parameter associated with the second electrical device 120 when the first and second sets of signal contacts 104, 124 are connected together and/or when the first and second sets of power contacts 102, 122 are connected together. The electronic control system 112 of the battery module 100 may measure the parameter through the first set of power contacts 102 and/or through the first set of signal contacts 104. The electronic control system 126 of the second electrical device 120 may measure the parameter through the second set of power contacts 122 and/or through the second set of signal contacts 124.

Figure 4:
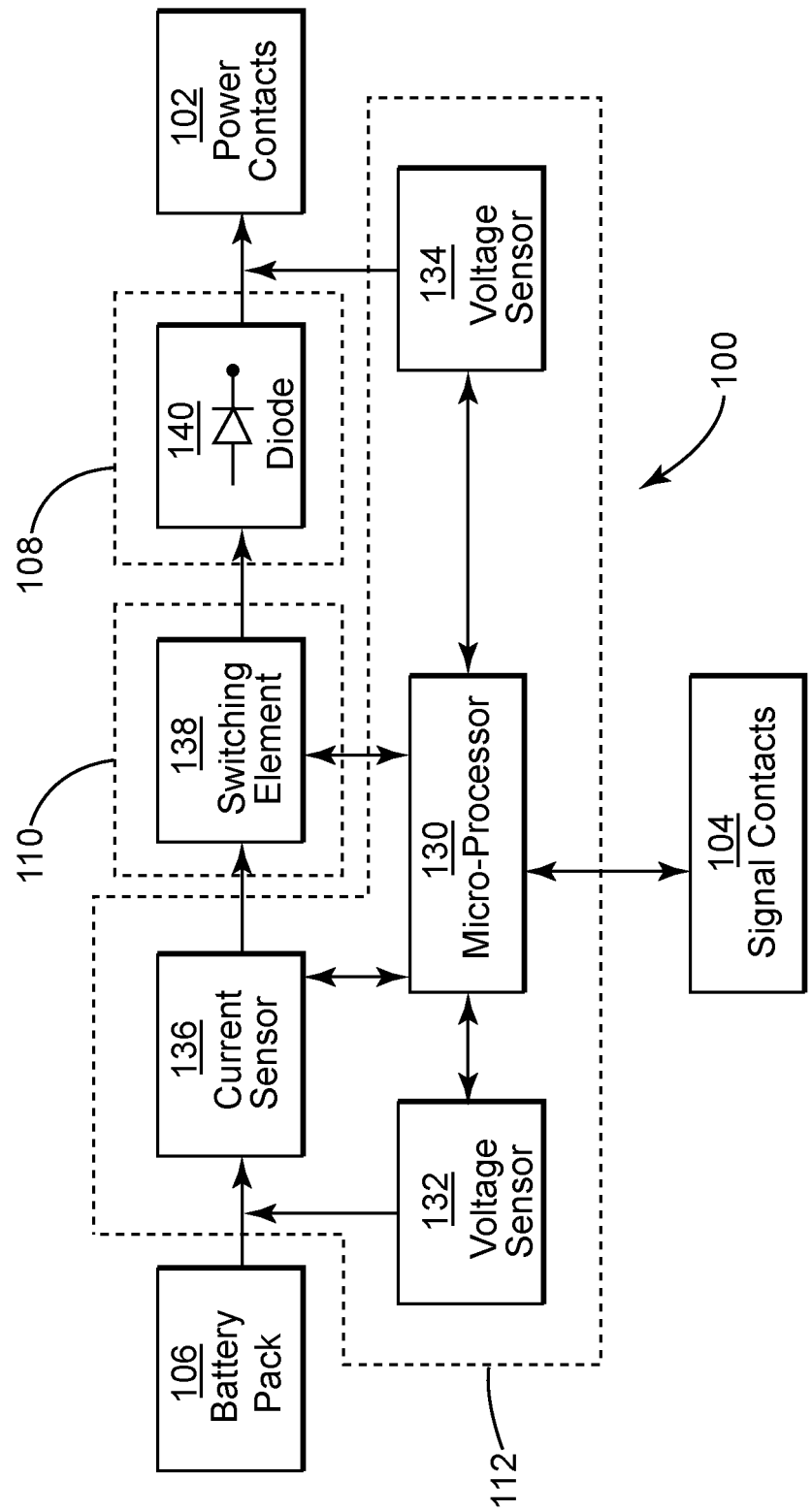
FIG. 4 depicts an example of a schematic of an embodiment of circuitry of an electrical control system, an electrical isolation system and a power flow control system of FIG. 2, according to aspects described herein.

Referring to FIG. 4, an example is depicted of a schematic of circuitry of the electronic control system 112, the electronic isolation system 110 and the power flow control system 208 of the battery module 100, according to aspects described herein. The electronic control system 112 may include a microprocessor 130 having a memory and an executable program in the memory. The microprocessor 130 may be in communication with, receive and/or process signals from the signal contacts 104 and/or the power contacts 102.

The electronic control system 112 may include various voltage sensors 132, 134, in electrical communication with the microprocessor 130, to measure various voltages between the first set of power contacts 102 and the battery pack 106. Further, the electronic control system 112 may include a current sensor 136, in electrical communication with the microprocessor 130, to measure the current being conducted between the battery pack 106 and the first set of power contacts 102.

The electronic isolation system 110 may include at least one switching device 138 electrically connected between the battery pack 106 and the first set of power contacts 102. When the at least one switching device 138 is in an open position, the first set of power contacts 102 are isolated from the battery pack 106. When the at least one switching device 138 is in a closed position, the first set of power contacts 102 are electrically connected to the battery pack 106. The at least one switching device 138 may include one or more relays, MOSFET and/or other types of transistor switches or the like.

The power control system 108 may include one or more diodes 140. Additionally, other unidirectional current elements and/or circuits may be utilized.

Figure 5:
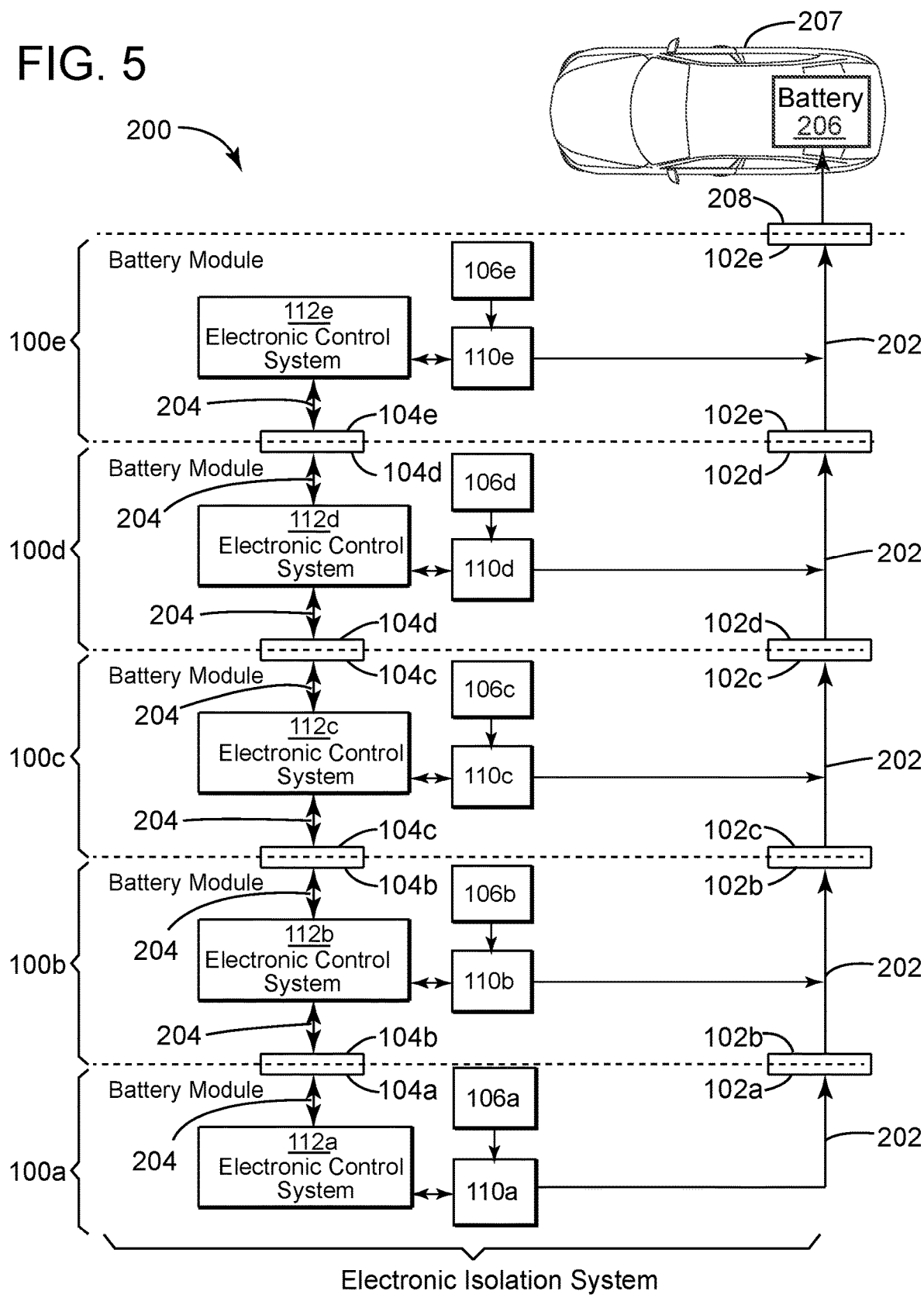
FIG. 5 depicts an example of a schematic of an embodiment of a battery module system having a plurality of battery modules of FIG. 1, according to aspects described herein.

Referring to FIG. 5, an example is depicted of a schematic of a battery module system 200 having a plurality of battery modules 100, according to aspects described herein. The battery module system 200 includes a battery module system power bus 202 that directs the power output from the electrically parallel connected battery modules 100 to an external electric load, such as the battery 206 of electric vehicle 207. By way of example, the power output of the battery module system 200 may be connected to the external electric load through a load connector 208.

In the example illustrated in FIG. 5, an external electric load is a battery 206 for an electric vehicle 207 that the battery module system 200 is charging. However, the external electric load may include any number of electric devices, systems and applications. For example, the external electric load may include power tools, aircraft systems or the like.

The battery module system 200 includes the plurality of battery modules 100*a*-100*e*, which are connected together in parallel at the power bus 202. However, any number of battery modules 100 may be used in the battery module system 200.

The like reference numbers for like components are used in FIG. 5 when referring to any, or all, of the battery modules, and/or the components and systems of the battery modules, in the battery module system 200. However, for purposes of clarity, when referring to a specific battery module, component or system in FIG. 5., the letters "a-e" are appended to the end of the reference number.

A first battery module 100*a* of the plurality of battery modules 100*a*-100*e* includes a first set of power contacts 102*a*, which are electrically connected to the power bus 202. First battery module 100*a* also includes a first set of signal contacts 104*a*, which are electrically connected together through a signal bus 204. Alternatively, the signal contacts may be independently connected to sources of signals such as various sensors. Such independent signals could be passed through a larger cable harness with independent conductors carrying such signals but without a common signal bus.

A first battery pack 106*a* of the first battery module 100*a* is operable to deliver electrical power to the first set of power contacts 102*a*. A first electronic isolation system 110*a* of the first battery module 100*a* is operable to electrically disconnect and connect the first battery pack 102*a* and the first set of power contacts 102*a*. A first electronic control system 112*a* is electrically connected to the first electronic isolation system 110*a* and to one, or both, of the first set of signal contacts 104*a* and the first set of power contacts 102*a*.

The electronic control system 112*a* of first battery module 100*a* may be operable to measure a parameter associated with the first battery module 100*a* and/or a second battery module 100*b* of the plurality of battery modules 100*a*-100*e*. The electronic control system 112*a* may also be operable to compare the parameter to a predefined value to determine if it is desirable to connect the first battery module 100*a* to the second battery module 100*b*. The electronic isolation system 110*a* of battery module 100*a* may then connect the battery pack 106*a* of battery module 100*a* to the first set of power contacts 102*a* of battery module 100*a* based on a positive (e.g., compatible state of charge or compatible voltages before charging) result of the comparison. The electronic isolation system 110a may disconnect the battery pack 106a and the first set of power contacts 102a based on a negative (e.g., non-compatible state of charge) result of the comparison.

Though the first and second battery modules of the battery module system 200 were specifically referenced as battery module 100a and battery module 100b respectively, the first and second battery modules may each be any battery module 100 of the battery module system 200. In other words, the first battery module 100 may include any battery module 100a-100e of the plurality of battery modules of battery module system 200. Additionally, the second battery module 100 may include any other battery module 100a-100e of the plurality of batter modules of battery module system 200.

The parameter measured by electronic control system 112a and associated with one, or both, of the first battery module 100a and the second battery module 100b, may further include: a first state of charge associated with the first battery module 100a, and a second state of charge associated with the battery module 100b. Additionally, the comparison of the parameter to a predefined value may further include: a comparison of a difference between the first state of charge and the second state of charge to a predefined acceptable range of the difference.

If the difference between the first state of charge (first SOC) and the second state of charge (second SOC) is within the acceptable range, the electronic isolation system 110a may connect the battery pack 106 to the first set of power contacts 102a. If the difference is not within the acceptable range, the electronic isolation system 110a may disconnect the battery pack 106a and the first set of power contacts 102a. An acceptable range may be that the SOC of the first battery module 100a be within plus or minus 50 percent, plus or minus 30 percent, plus or minus 25 percent, plus or minus 15 percent, plus or minus 10 percent, or plus or minus 5 percent of the SOC of the second battery module 100b.

The first battery module 100a of the battery module system 200 also may include a first power flow control system 108a connected between the first battery pack 106a and the first set of power contacts 102a. The first power flow control system 108a is operable to prevent, or inhibit to a substantially insignificant level, reverse flow of current from the first set of power contacts 102a to the first battery pack 106a. This may be done with one or more diodes 140 (see FIG. 4) of with the use of other unidirectional current elements or circuits.

The second battery module 100b may also include a second power flow control system 108b connected between the second battery pack 106b and the second set of power contacts 102b. The second power flow control system 108b is operable to prevent or inhibit reverse flow of current from the second set of power contacts 102b to the second battery pack 106b.

The various battery modules 100a-100e of the battery module system 200 may also include a top detection device and a bottom detection device. For example, the first battery module 100a may include a top detection device that is operable to detect another battery module 100 of the plurality of battery modules 100a-100e positioned on a top of the first battery module 100a. Additionally, the first battery module 100a may include a bottom detection device that is operable to detect another battery module 100 of the plurality of battery modules 100a-100e positioned on a bottom of the first battery module 100a.

The top and bottom detection devices may include any number of circuit elements and systems designed to determine if a battery module 100 is in the middle portion of the stack of battery modules 100. The top and bottom detection devices may also aid in determining how many battery modules 100 are above or below any given battery module 100. In an example, a CAN bus contact may be enabled on a bottom side of a bottommost battery module (e.g., battery module 100a) in a stack of battery modules to allow the contact to connect to such a CAN bus. In the remainder, i.e., non-bottommost battery modules, such a CAN bus contact would not be enabled since the CAN bus would only be connected to the bottommost module and a CAN bus contact on a middle or top module in a stack would not be useful. Thus, a location detection device (e.g., a top or bottom detection device) may be useful when only one or more of a stack of battery modules connect to another device, or otherwise function differently that a rest of the stack of battery modules. Another example of a use for the top and bottom detectors is that they may be able to determine if the power bus may be safely isolated from a user/operator. On the bottommost batter a base or cover may be included to ensure the power bus remains fully isolated.

Figure 6:
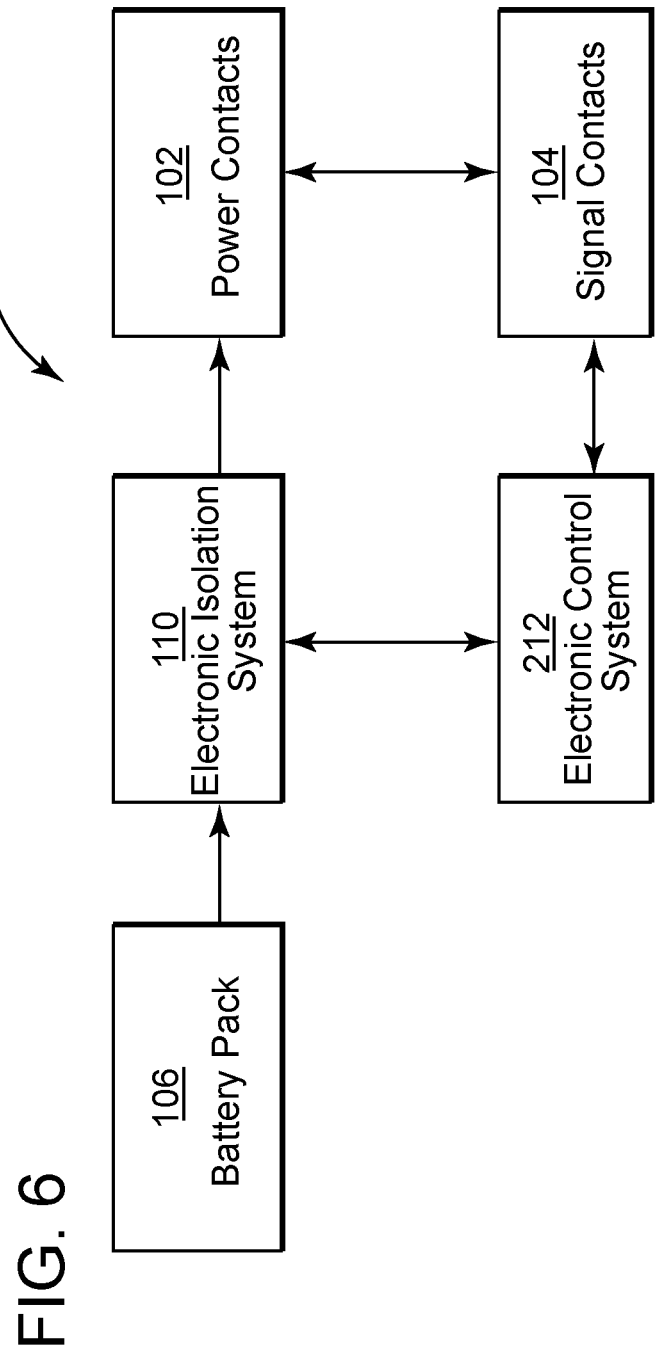
FIG. 6 depicts an example of a schematic of another embodiment of power and communication systems of the battery module of FIG. 1, according to aspects described herein.

Referring to FIG. 6, an example is depicted of a schematic of another embodiment of power and communication systems of the battery module 100, according to aspects described herein. The main difference between the embodiment of module 100 in FIG. 6 and the embodiment of module 100 in FIG. 1 is that the power flow control system 108 is removed. By removing the power flow control system 108 including its diodes 140 (see FIG. 4) and/or other unidirectional circuitry, the efficiency of the battery module may be increased. However, as will be explained in greater detail herein, the circuitry of the electronic control 112, may be modified to compensate for the removal of the power flow control system 108.

In the remaining FIGS. 6-9, many of the components described have the same or similar form fit and function as components described earlier herein. When that is the case, the components will be referred to with the same reference numbers.

The battery module 100 includes a first set of power contacts 102 and a first set of signal contacts 104. A battery pack 106 is operable to deliver electrical power to the set of power contacts 102. An electronic isolation system 110 is operable to electrically disconnect and electrically connect the battery pack 106 and the first set of power contacts 102.

An electronic control system 212 is electrically connected to the electronic isolation system 110 and to the first set of signal contacts 104 and/or the first set of power contacts 102. However, the electronic control system 212 is designed to compensate for the removal of the power flow control system 108.

Figure 7:
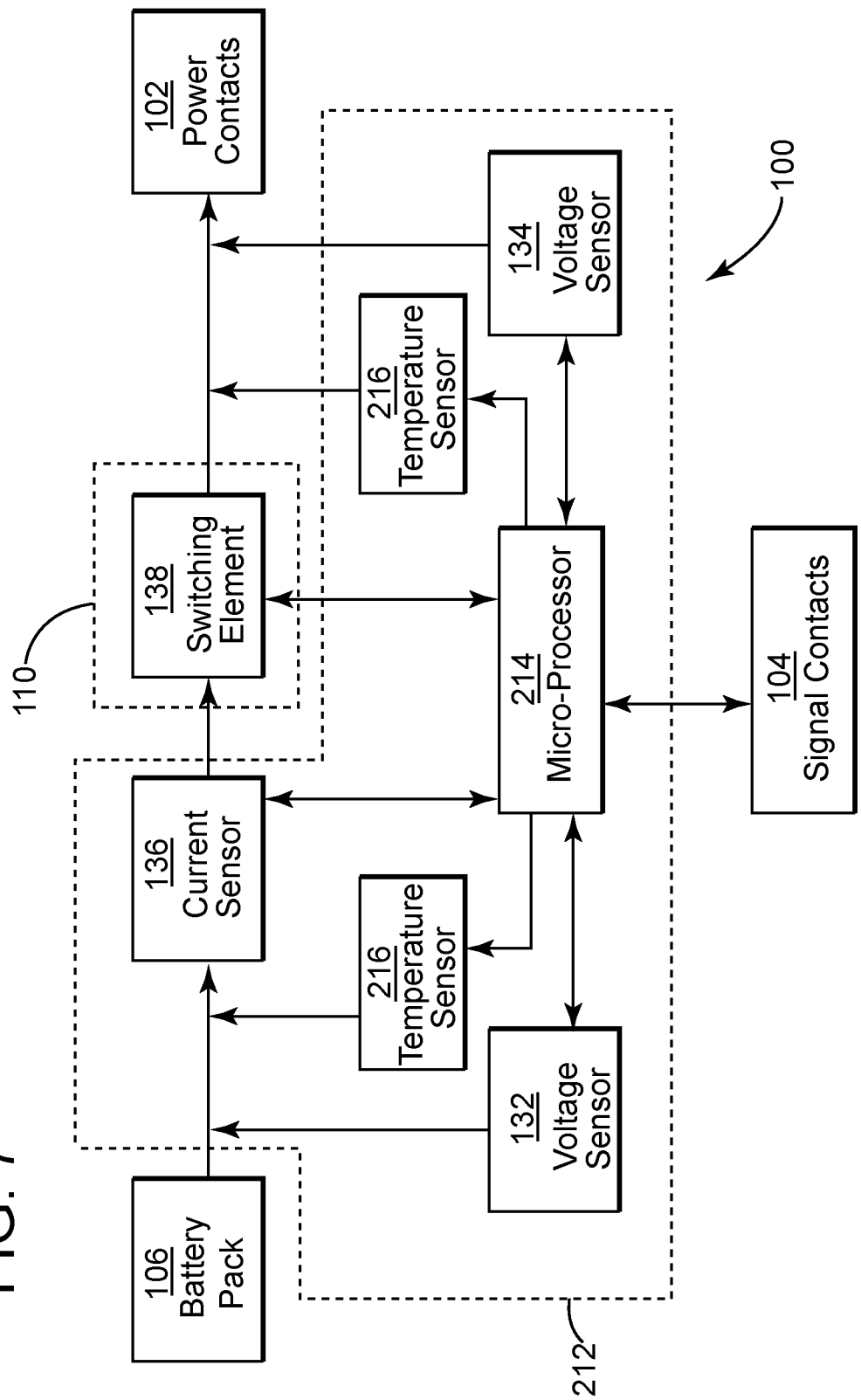
FIG. 7 depicts an example of a schematic of another embodiment of circuitry of an electrical control system and an electrical isolation system of FIG. 6, according to aspects described herein.

Referring to FIG. 7, an example is depicted of a schematic of circuitry of the electrical control system 212 and the electronic isolation system 110, according to aspects described herein. The electronic isolation system 110 is similar to that described earlier in FIG. 4 and may include at least one switching device 138 electrically connected between the battery pack 106 and the first set of power contacts 102.

However, a microprocessor 214 of electronic control system 212 includes an algorithm in its memory specifically designed to compensate for the removal of the power flow control system 108. The algorithm is stored in a memory of the microprocessor 214 as a set of instructions for execution by the microprocessor to perform one or more methods to determine the optimal time and conditions for connecting the battery module to another electrical device (such as a second battery module) with minimum current backflow. Additionally, the microprocessor 214 may be in communication with more instruments in order to execute the methods of connecting the battery module 100 to another electrical device. In the example illustrated in FIG. 7, the microprocessor is in electrical communication with one or more voltage sensors 132, 134, one or more current sensors 136 and one or more temperature sensors 216.

Accordingly, the electronic control system 212 is operable to obtain a first comparison between a state of charge of the battery module 100 and an electrical device, such as electrical device 120 in FIG. 3. The electronic control system 212 is also operable to obtain a second comparison between a state of health of the battery module 100 and the electrical device 120. The electronic control system 100 is also operable to obtain a third comparison between a temperature (such as an average temperature) of the battery module 100 and the electrical device 120. The electronic control system 100 is also operable to obtain a fourth comparison between a power (such as output power) of the battery module 100 and the electrical device 120.

The electronic control system 212, may then calculate a closing parameter based on the first comparison, the second comparison, the third comparison and/or the fourth comparison. Thereafter the closing parameter may be compared to a predefined closing parameter value to result in a connect determination as to whether it is desirable to connect the first battery module to the electrical device. The electronic isolation system may connect the battery pack 106 to the first set of power contacts 102 based on a positive result of the connect determination. The electronic isolation system 212 may disconnect the battery pack 106 and the first set of power contacts 102 based on a negative result of the connect determination.

Figure 8:
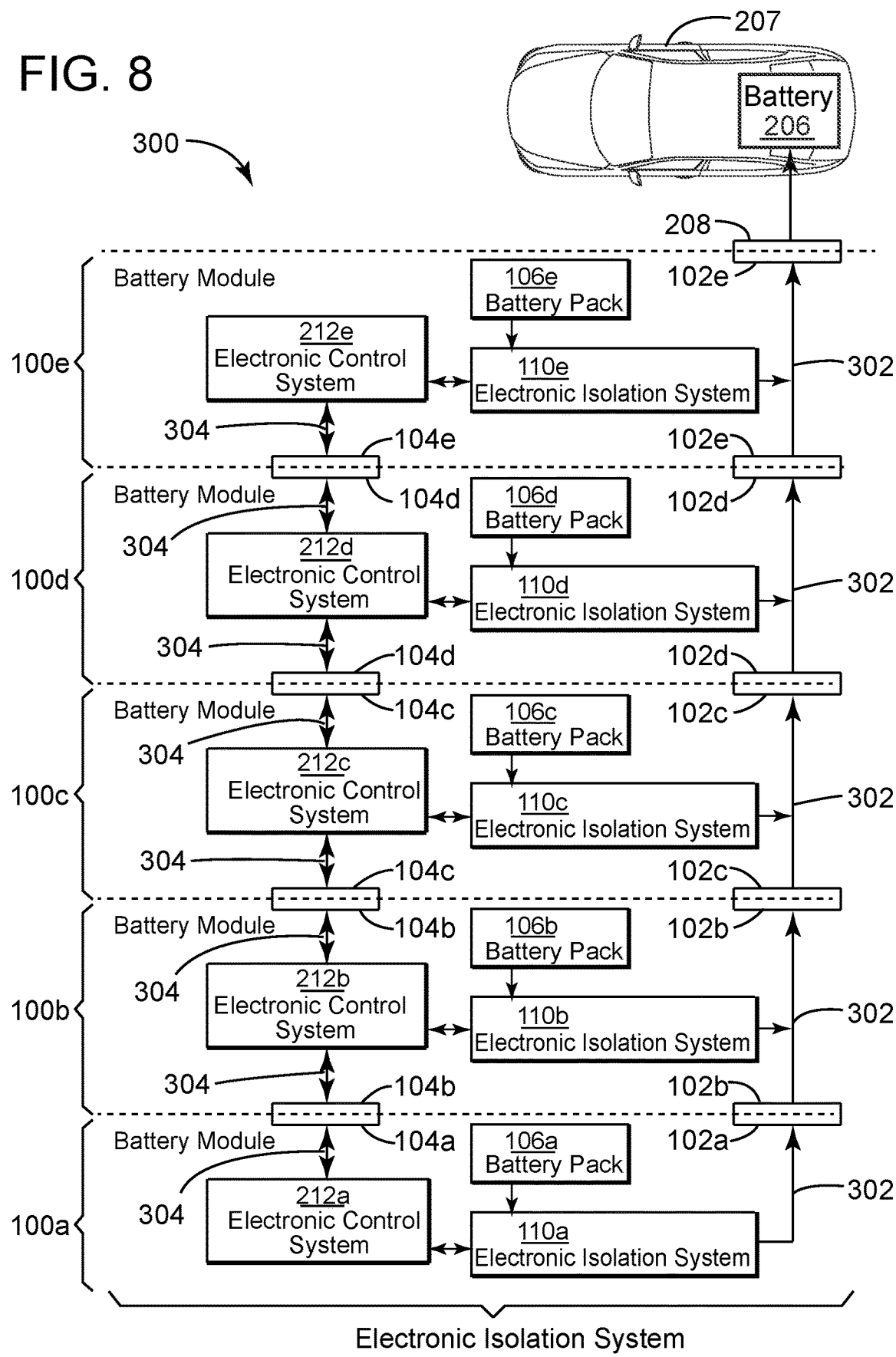
FIG. 8 depicts an example of a schematic of another embodiment of a battery module system having a plurality of battery modules of FIG. 1, according to aspects described herein.

The battery module 100 may be a first battery module, such a first battery module 100a (see FIGS. 5 and 8) and the electrical device 120 may be a second battery module, such second battery module 100b (see FIGS. 5 and 8). That being the case, then the first comparison may include a difference between a state of charge of the first battery module 100a and the second battery module 100b. The second comparison may include a difference between a state of health of the first battery module 100a and the second battery module 100b. The third comparison may include a difference between a temperature of the first battery module 100a and the second battery module 100b. Finally, the fourth comparison may include a difference between a power of the first battery module 100a and the second battery module 100b.

Referring to FIG. 8, an example is depicted of a schematic of another embodiment of a battery module system 300 having a plurality of battery modules 100a-100e, according to aspects described herein. The battery module system 300 includes a power bus 302 connected to the power contacts 102a-102e of the battery modules 100a-100e in similar fashion that that shown in FIG. 5. The battery module system 300 also incudes a signal bus 304 connected to the signal contacts 104a-104b in similar fashion to that shown in FIG. 5.

In the example illustrated in FIG. 8, the first battery module 100a and the second battery module 100b are at least a portion of the plurality of battery modules 100a-100e of the battery module system 300. The battery module system 300 includes the power bus 302 that is operable to be connected to the first set of power contacts 102a of the first battery module 100a and the first set of contacts 102b of the second battery module 100b.

The closing parameter, as described earlier, may be an absolute value of a difference between a closing voltage and a sag voltage. The sag voltage, as used herein, is a measured voltage on the power bus 302 prior to the power contacts 102a of the battery module 100a being connected to the power bus 302. The closing voltage, as used herein, is be a predicted value of what the sag voltage will become if the power contacts 102a of the battery module 100a are connected to the power bus 302.

The predefined closing parameter value, that the closing parameter will be compared to, may vary. For example, the closing parameter may be less than 5 volts, less than 4 volts, less than 3 volts, less than 2 volts or less than 1 volts.

The algorithm stored as instructions in the memory of microprocessor 212, may calculate the closing parameter and determine a connect determination by measuring the temperature of the battery module 100a and the electrical device, such as second battery module 100b with the one temperature sensor 216 (see FIG. 7). A current of the battery module 100a and the second battery module 100b may be measured with the current sensor 136. A voltage of the first battery module 100a and the second battery module 100b may be measured with the voltage sensors 132, 134. A state of charge, a state of health and power of the first and second battery modules 100a, 100b may be calculated with the measured temperature, current and voltage. The temperature, the power, the state of charge and the state of health may then be used to obtain the first, second, third and fourth comparisons discussed earlier. The closing parameter may then be calculated based on the first, second, third and fourth comparisons. The closing parameter may then be compared to the predefined closing parameter value to result in a connect determination.

Additionally, a running state of the first battery module 100a will affect the closing parameter and, therefore, the results of the connect determination. Three running states that are of most significance are a "before power draw" running state, a "during power draw" running state and a "after power draw" running state. They are defined herein as follows:

"Before power draw": is when a system, such as the battery module system 300, is idle and hasn't been run yet since being connected to an external electrical load, such as a battery 206 of an electric vehicle 207. This occurs before any energy is drawn from a battery module, such as battery module 100a. In this state the battery module could be closed into the power bus or it could still be open. A main factor, which distinguishes this state over the other two states, is that once a battery module is closed into the power bus, no power will flow into the external electric load. With a load such as an electric vehicle 207, this would be the time before the vehicle starts charging.

"During power draw": is when the battery module, such as battery module 100a, is supplying energy to the external electric load, such as a battery 206 of an electric vehicle 207. With a load such as an electric vehicle 207, this is the time while the vehicle is charging. In this state, power is flowing from the battery module into the external electric load.

"After power draw": is the time that a battery module, such as battery module 100a, is still connected into a system, such as battery module system 300, but no more power is being drawn. This could be when an external electric load, such as electric vehicle 207, stops charging or when the external electronic load is removed from the system. This is different than the "before power draw" state in that the battery module will have any voltage sag removed due to the power draw stopping. Therefore, the battery module voltage will rise back up to its open circuit voltage.

Accordingly, the method used by the microprocessor 214 to calculate a connect determination may include the steps of determining the running state of the battery module, the running state being the "before power draw" state, the "during power draw" state and/or the "after power draw" state. Thereafter, the running state may be used to calculate the closing parameter.

Figure 9:
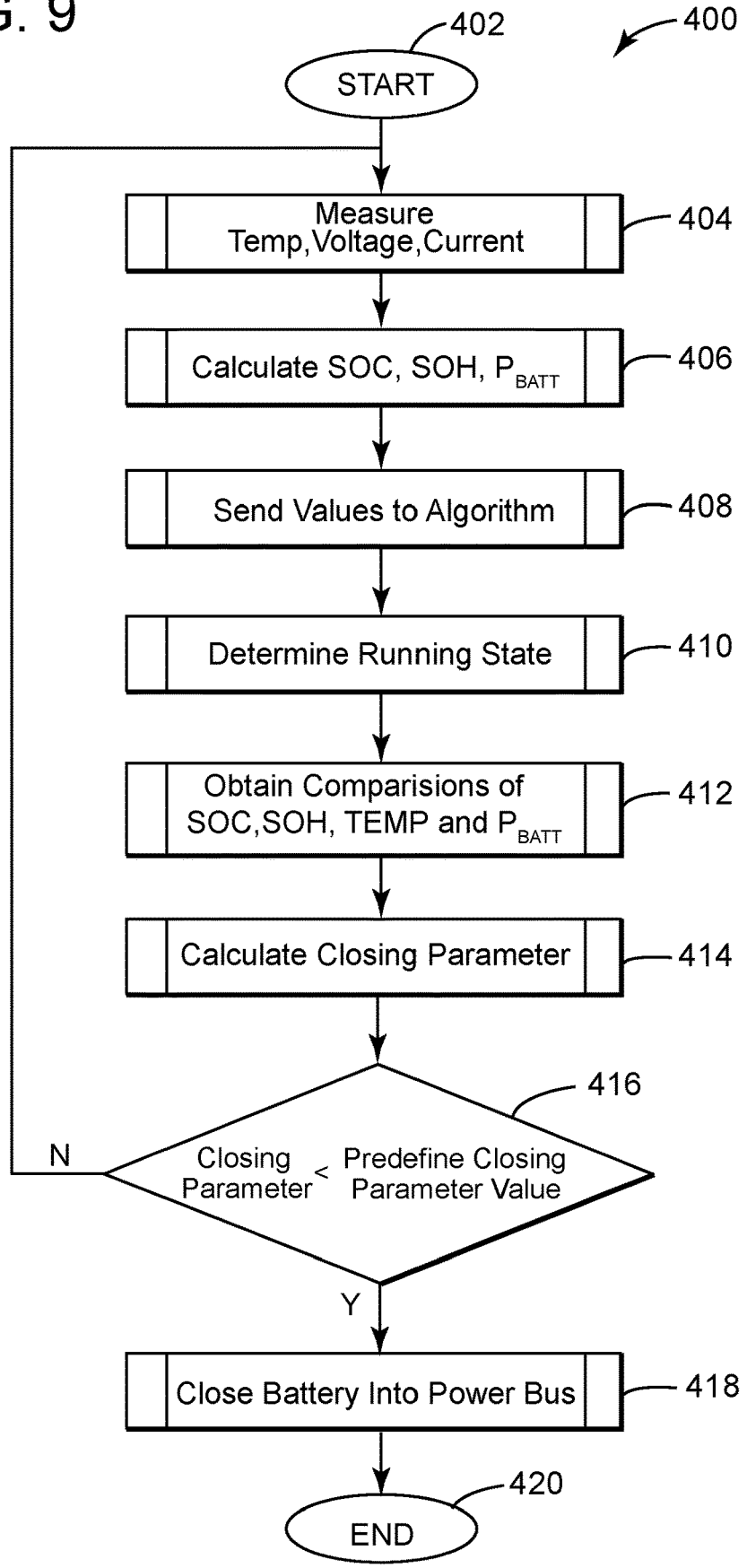
FIG. 9 depicts an example of a flow diagram a method for connecting a battery module, such as the battery module of FIG. 1, to an electrical device, according to aspects described herein.

Referring to FIG. 9, an example is depicted of a flow diagram 400 of a computer implemented method for connecting a battery module to an electrical device, according to aspects described herein. By way of example and as used herein, the battery module may be first battery module 100a and the electrical device may be second battery module 100b. Both battery modules 100a, 100b may be connected to a battery module system, such as battery module system 300.

The method starts at 402 when the first battery module 100a is initially turned on and its control circuits, including its microprocessor 214, are active. Additionally, the electrical device, e.g., battery module 100b, is also turned on and providing signals to the battery module 100a. At this point of initial start-up, the electronic isolation system 110 defaults to disconnect the battery pack 106 from the power contacts 102 of the battery module 100a.

At 404, a temperature of the first battery module 100a and the second battery module 100a is measured by one or more temperature sensors, such as temperature sensors 216. The temperature may be an average temperature of both first and second battery modules 100a, 100b. The temperature sensors may be positioned as several locations throughout the battery modules 100a, 100b. The temperature data from battery module 100b may be transmitted as signal data into the signal contacts 104a and to the microprocessor 214 of battery module 100a.

Additionally, at 404, a current of the first and second battery modules 100a, 100b may be measured with a current sensor, such as current sensor 136. The current may be the output current of the battery modules 100a, 100b.

Additionally, at 404, a voltage of the first and second battery modules 100a, 100b may be measured with a voltage sensor, such as voltage sensors 132 and 134. The voltage may be the output voltage of the first and second battery modules 100a, 100b.

At 406, a state of charge, a state of health and a power of the first and second battery modules 100a, 100b is calculated from at least one of the current, temperature and/or voltage of the battery modules. The power may be the output power of the first and second battery modules 100a, 100b.

At 408, the measured and calculated values are sent to the algorithm of the microprocessor 214. The algorithm is in the form of executable instructions stored in the memory of the microprocessor 214.

At 410, the running state of the battery module 100a is determined. The running state may be a before power draw state, a during power draw state and an after-power draw state.

At 412, the algorithm obtains a first comparison between a state of charge of the first battery module 100a (i.e., the battery module) and the second battery module 100b (i.e., the electrical device). The algorithm also obtains a second comparison between a state of health of the first battery module 100a and the second battery module 100b. The algorithm also obtains a third comparison between a temperature of the first battery module 100a and the second battery module 100b. The algorithm also obtains a fourth comparison between a power of the first battery module 100a and the second battery module 100b. One form of comparison may be a difference. That is, the comparisons of the state of charge, state of health, temperature and power between first and second battery modules 100a, 100b may be a difference between the values of the state of charge, state of health, temperature and power of the first and second battery modules 100a, 100b.

At 414, a closing parameter is calculated based on the first, second, third and/or fourth comparisons. The closing parameter may also be based on the determined running state. For example, the closing parameter may be an absolute value of a difference between a closing voltage and a sag voltage. The sag voltage may be a measured voltage on the power bus 302 prior to the power contacts 102a of the first battery module 100a being connected to the power bus 320. The closing voltage may be a predicted value of what the sag voltage will become if the power contacts 102a of the first battery module 100a are connected to the power bus 302.

At 416, the closing parameter is compared to a predefined closing parameter value to result in a connect determination. For the case where the closing parameter is an absolute value of a difference between a closing voltage and a sag voltage, the predefined closing parameter value may be that the absolute value must be less than 5 volts, less than 4 volts, less than 3 volts less than 2 volts or less than 1 volt. The predefined closing parameter value may vary with the running state.

If the connect determination is a negative result, for example, if the closing parameter does not fall within the range of the predetermined closing parameter value, then the first battery module 100a will be disconnected (or remain disconnected) from the second battery module 100b. This will be implemented by the microprocessor 214 of the electronic control system 212 providing a signal command to the electronic isolation system 110 to not connect the battery pack 106 to the power contacts 104a of battery module 100a. The method will then loop back to 404 and begin a new sequence of steps.

At 418, if the connect determination is a positive result, for example, if the closing parameter falls within the range of the predetermined closing parameter value, then the first battery module 100a will be connected to the second battery module 100b. This will be implemented by the microprocessor 214 of the electronic control system 212 providing a signal command (such as a control voltage) to the electronic isolation system 110 to connect the battery pack 106 to the power contacts 104a of battery module 100a. The batter pack 106 of the first battery module 100a may then be connected to the power bus 302 of the battery module system 300 and to the second battery module 100b. The method will then stop at 420.

Although systems (e.g., battery module 100, electric device 120, battery module system 200, and battery module system 300) and methods are described herein for charging a battery (e.g., battery 206) of an electric vehicle (e.g., electric vehicle 207) such systems and methods may be used to supply electrical energy to an electrical load and/or charge to other energy storage devices. Such other energy storage devices could be grid tied energy storage devices, or mobile energy storage devices for uses ranging from personal electronics to industrial electrical vehicles (e.g., forklift trucks or other work vehicles).

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A battery module, comprising:
a first set of power contacts;
a battery pack operable to deliver electrical power to the set of power contacts;
an electronic isolation system operable to electrically disconnect and electrically connect the battery pack and the first set of power contacts; and
an electronic control system electrically connected to the electronic isolation system, the electronic control system comprising at least one sensor in communication with a microprocessor, the microprocessor comprising:
a memory, and
an algorithm stored in the memory as a set of instructions for execution by the microprocessor, the algorithm being programmed to:
sense signals from the at least one sensor indicative of parameters measured on the battery module and an electrical device, and
calculate a closing parameter based on the sensed signals, wherein the closing parameter comprises an absolute value of a difference between a closing voltage and a sag voltage, the sag voltage comprising a measured voltage on the electrical device prior to the power contacts of the battery module being connected to the electrical device, and the closing voltage being a predicted value of what the sag voltage will become if the power contacts of the battery module are connected to the electrical device.

2. The battery module of claim 1, comprising:
a first set of signal contacts; and
the electronic control system electrically connected to at least one of the first set of signal contacts or the first set of power contacts.

3. The battery module of claim 1, wherein the algorithm is further programmed to:
compare the closing parameter to a predefined closing parameter value to result in a connect determination as to whether it is desirable to connect the first battery module to the electrical device prior to connecting the first battery module to the electrical device; and
wherein the electronic isolation system only connects the battery pack to the first set of power contacts when a positive result of the connect determination is obtained.

4. The battery module of claim 3, wherein the predefined closing parameter value is less than 5 volts.

5. The battery module of claim 3, wherein the predefined closing parameter value is less than 2 volts.

6. The battery module of claim 1, wherein the algorithm is further programmed to:
based on the sensed signals, obtain at least one of a first comparison between a state of charge of the battery module and the electrical device, a second comparison between a state of health of the battery module and the electrical device, a third comparison between a temperature of the battery module and the electrical device or a fourth comparison between a power of the battery module and the electrical device, and
calculate the closing parameter based on the at least one of the first comparison, the second comparison, the third comparison or the fourth comparison.

7. The battery module of claim 6, wherein the electronic control system comprises:
the at least one sensor comprising a temperature sensor, a current sensor and a voltage sensor; and
the microprocessor in communication with the temperature sensor, the current sensor and the voltage sensor, the algorithm of the microprocessor further programmed to perform a method comprising:
measuring the temperature of the battery module and the electrical device with the temperature sensor,
measuring a current of the battery module and the electrical device with current sensor,
measuring voltage of the battery module and the electrical device with the voltage sensor,
calculating a state of charge of the battery module, a state of health of the battery module and a power of the battery module with measured temperature, current and voltage, and
utilizing the temperature, the power, the state of charge and the state of health to obtain the first, second, third and fourth comparisons.

8. The battery module of claim 7, wherein the method further comprises:
determining the running state of the battery module, the running state comprising: a before power draw state, a during power draw state and an after power draw state; and
utilizing the running state to calculate the closing parameter.

9. The battery module of claim 1, wherein the electrical device comprises a second battery module.

10. The battery module of claim 9, comprising:
the battery module and the second battery module comprising at least a portion of a plurality of battery modules of a battery module system, the battery module system including a power bus operable to be connected to the first set of power contacts of the battery module.

11. A battery module, comprising:
a first set of power contacts;
a battery pack operable to deliver electrical power to the set of power contacts;
an electronic isolation system operable to electrically disconnect and electrically connect the battery pack and the first set of power contacts; and
an electronic control system electrically connected to the electronic isolation system, the electronic control system comprising at least one sensor in communication with a microprocessor, the microprocessor comprising:
a memory, and
an algorithm stored in the memory as a set of instructions for execution by the microprocessor, the algorithm being programmed to:
sense signals from the at least one sensor indicative of parameters measured on the battery module and an electrical device,
calculate a closing parameter based on the sensed signals, wherein the closing parameter comprises an absolute value of a difference between a closing voltage and a sag voltage, the sag voltage comprising a measured voltage on the electrical device prior to the power contacts of the battery module being connected to the electrical device, and the closing voltage being a predicted value of what the sag voltage will become if the power contacts of the battery module are connected to the electrical device, and compare the closing parameter to a predefined closing parameter value to result in a connect determination as to whether it is desirable to connect the first battery module to the electrical device prior to connecting the first battery module to the electrical device; and wherein the electronic isolation system only connects the battery pack to the first set of power contacts when a positive result of the connect determination is obtained.

12. The battery module of claim 11, comprising:
a first set of signal contacts; and
the electronic control system electrically connected to at least one of the first set of signal contacts or the first set of power contacts.

13. The battery module of claim 11, wherein the algorithm is further programmed to:
based on the sensed signals, obtain at least one of a first comparison between a state of charge of the battery module and the electrical device, a second comparison between a state of health of the battery module and the electrical device, a third comparison between a temperature of the battery module and the electrical device or a fourth comparison between a power of the battery module and the electrical device, and
calculate the closing parameter based on the at least one of the first comparison, the second comparison, the third comparison or the fourth comparison.

14. The battery module of claim 13, wherein the electronic control system comprises:
the at least one sensor comprising a temperature sensor, a current sensor and a voltage sensor; and
the microprocessor in communication with the temperature sensor, the current sensor and the voltage sensor, the algorithm of the microprocessor further programmed to perform a method comprising:
measuring the temperature of the battery module and the electrical device with the temperature sensor,
measuring a current of the battery module and the electrical device with current sensor,
measuring voltage of the battery module and the electrical device with the voltage sensor,
calculating a state of charge of the battery module, a state of health of the battery module and a power of the battery module with measured temperature, current and voltage, and
utilizing the temperature, the power, the state of charge and the state of health to obtain the first, second, third and fourth comparisons.

15. The battery module of claim 14, wherein the method further comprises:
determining the running state of the battery module, the running state comprising: a before power draw state, a during power draw state and an after power draw state; and
utilizing the running state to calculate the closing parameter.

16. The battery module of claim 11, wherein the electrical device comprises a second battery module.

17. The battery module of claim 16, comprising:
the battery module and the second battery module comprising at least a portion of a plurality of battery modules of a battery module system, the battery module system including a power bus operable to be connected to the first set of power contacts of the battery module.

\* \* \* \* \*